(12) United States Patent
Hsu

(10) Patent No.: US 6,474,759 B2
(45) Date of Patent: Nov. 5, 2002

(54) CABINET

(75) Inventor: Mu-Chuan Hsu, Taipei (TW)

(73) Assignee: L & F Platics Co., Ltd., Taipei (TW)

( * ) Notice: Subject to any disclaimer, the term of this patent is extended or adjusted under 35 U.S.C. 154(b) by 0 days.

(21) Appl. No.: 09/780,084

(22) Filed: Feb. 9, 2001

(65) Prior Publication Data

US 2002/0109442 A1 Aug. 15, 2002

(51) Int. Cl.⁷ .............................................. A47B 47/00
(52) U.S. Cl. ..................... 312/263; 312/257.1; 312/108
(58) Field of Search .............................. 312/263, 257.1, 312/265.5, 107, 108, 111, 326

(56) References Cited

U.S. PATENT DOCUMENTS

| | | | | |
|---|---|---|---|---|
| 2,424,217 A | * | 7/1947 | Bales ........................ | 312/257.1 |
| 2,483,606 A | * | 10/1949 | Albach et al. ............ | 312/257.1 |
| 3,853,367 A | * | 12/1974 | Jamison et al. ...... | 312/257.1 X |
| 5,372,415 A | * | 12/1994 | Tisbo et al. ................. | 312/108 |
| 5,382,088 A | * | 1/1995 | Young ........................ | 312/263 |
| 5,466,058 A | * | 11/1995 | Chan ....................... | 312/263 X |
| 5,839,806 A | * | 11/1998 | Liu ......................... | 312/108 X |
| 5,913,580 A | * | 6/1999 | Liu ......................... | 312/263 X |
| 5,921,646 A | * | 7/1999 | Hwang ....................... | 312/263 |

FOREIGN PATENT DOCUMENTS

| | | | | |
|---|---|---|---|---|
| FR | 312257 | * | 10/1960 | ............... 312/257.1 |
| JP | 6-141941 | * | 5/1994 | ................. 312/201 |

* cited by examiner

*Primary Examiner*—James O. Hansen
(74) *Attorney, Agent, or Firm*—Alan D. Kamrath; Rider, Bennett, Egan & Arundel

(57) ABSTRACT

A detachable cabinet comprises a bottom plate including four slots each on a corner, two spaced wells on the rear side, and a projection on the corner at the front side. A pair of side plates each includes two bottom pegs, a front longitudinal groove, an abutment member clung onto the front longitudinal groove, a rear longitudinal groove, and two spaced studs on the top. A rear plate includes two spaced studs on the bottom and on the top. A top plate includes six apertures on the bottom side and a slot on a front corner at the bottom side. A front door includes a projection on the top at the side opposite to a handle and a slot on the bottom on the same side as the projection of the door. A number of configurations are possible. Further, the cabinet is easy to assemble and is sturdy.

15 Claims, 5 Drawing Sheets

CABINET

FIELD OF THE INVENTION

The present invention relates to a cabinet and more particularly to a detachable cabinet with improved characteristics.

BACKGROUND OF THE INVENTION

There is a wide variety of storage furniture commercially available presently. Hence, a user may buy a suitable one to store desired articles. Recently, do-it-yourself (DIY) detachable cabinets are popular. Some cabinets are advantageous for being easy in assembly, while others are advantageous for being sturdy. However, none of the current cabinets has both advantages. Thus, the need for improvement exists.

SUMMARY OF THE INVENTION

It is an object of the present invention to provide a detachable cabinet comprising a bottom plate including a slot on each of the four corners, two spaced wells on the rear side adjacent the slots, and a projection on the corner at the front side. A pair of side plates each includes two pegs projected downwardly from the front and the rear side, a front longitudinal groove, an abutment member having a U-shaped cross-section clung onto the front longitudinal groove, a rear longitudinal groove, and two spaced studs on the top side adjacent the front and the rear longitudinal groove. A rear plate includes two spaced studs on the bottom and the top side. A top plate includes six apertures on the bottom side and a slot on a front corner at the bottom side. A front door includes a handle on one side and is magnetically connectable to the front side of the left plate, a projection on the top at the side opposite to the handle, and a slot on the bottom on the same side as the projection of the door. The pegs of the side plates are received in the slots of the bottom plate. The vertical sides of the rear plate are received in the rear longitudinal grooves. The bottom studs of the rear plate are received in the wells of the bottom plate. The projection of the bottom plate is inserted into the slot of the door. The studs of the side plates and the top studs of the rear plate are inserted into the apertures of the top plate. The projection of the front door is inserted into the slot of the top plate.

In one aspect of the present invention, the top plate further comprises four holes on the top and the bottom plate further comprises four hollow legs on the bottom so that a first cabinet is capable of being secured onto a second cabinet by inserting four flexible plastic fasteners through the legs of the bottom plate and through the holes of the top plate.

In another aspect of the present invention, there is a single large drawer in the cabinet.

In still another aspect of the present invention, each of the side plates and the rear plate comprises a transverse groove, and the cabinet further comprises a divider having three elongated side protrusions inserted into the transverse grooves.

In still another aspect of the present invention, there are two drawers in the cabinet with the divider sandwiched therebetween.

The above and other objects, features and advantages of the present invention will become apparent from the following detailed description taken with the accompanying drawings.

DETAILED DESCRIPTION OF THE PREFERRED EMBODIMENTS

Figure 1:
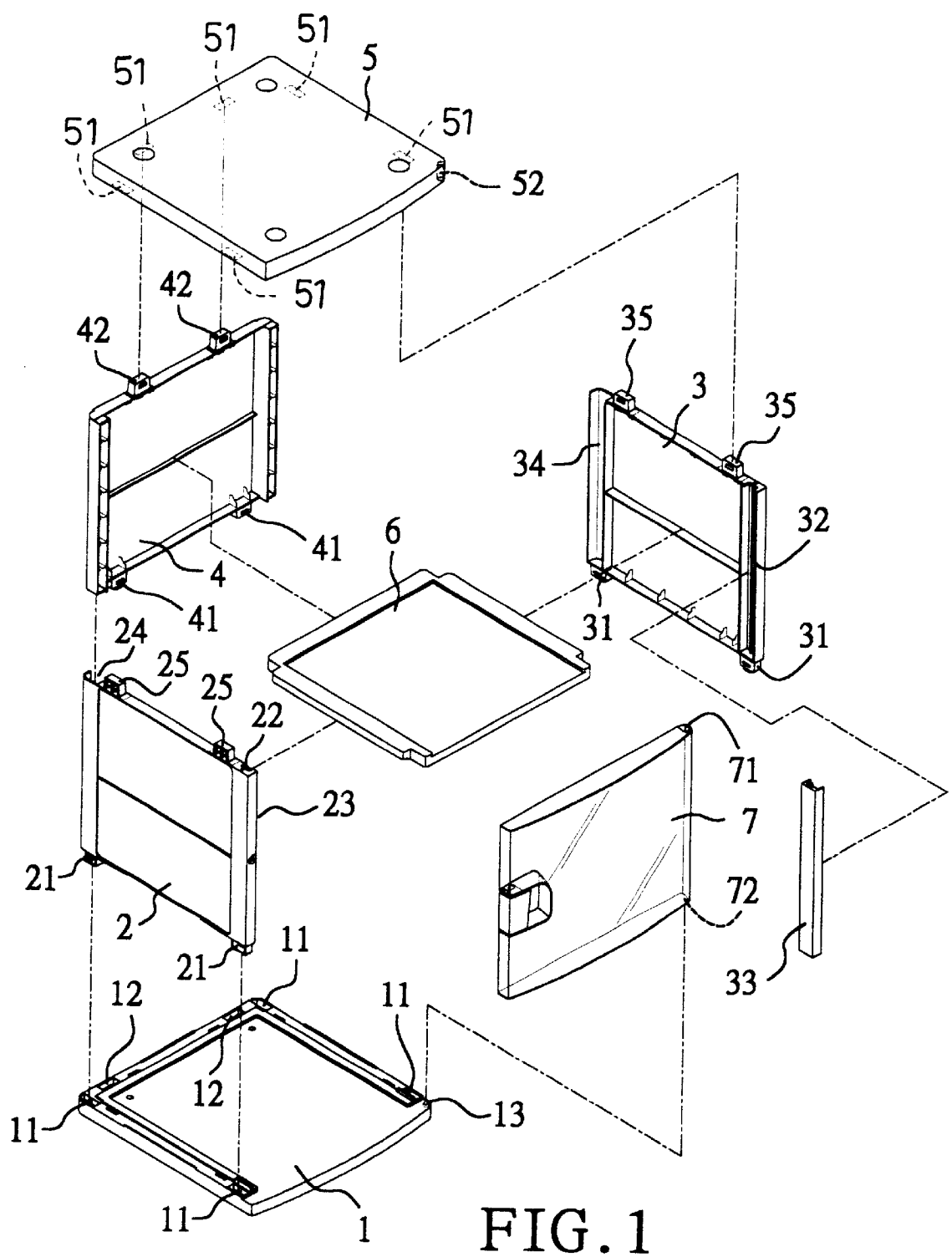
FIG. 1 is an exploded view of a first preferred embodiment of a cabinet according to the invention.
Figure 2:
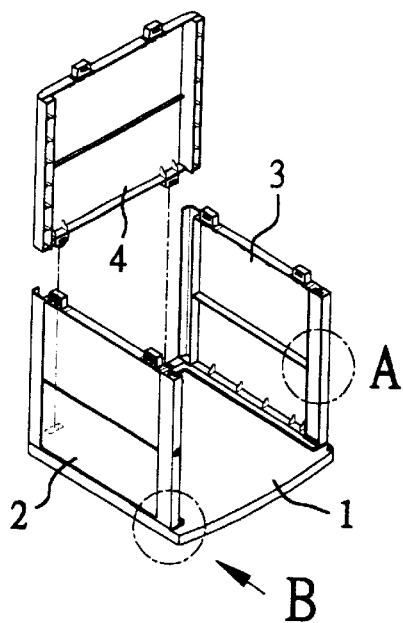
FIG. 2 is an exploded perspective view of a partially assembled cabinet of FIG. 1.
Figure 3:
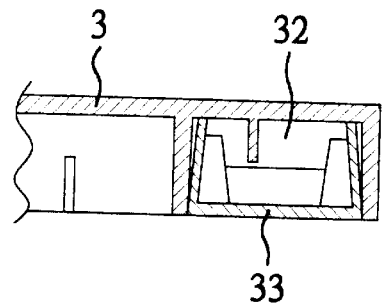
FIG. 3 is a greatly enlarged fragmentary sectional view of an area A circled in FIG. 2.
Figure 4:
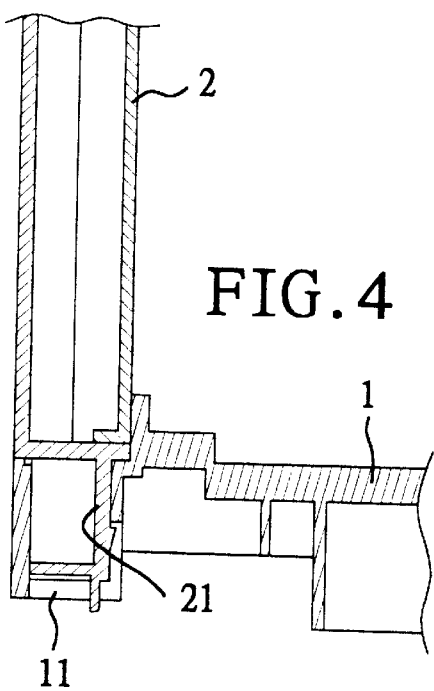
FIG. 4 is a greatly enlarged fragmentary sectional view of an area B circled in FIG. 2.
Figure 5:
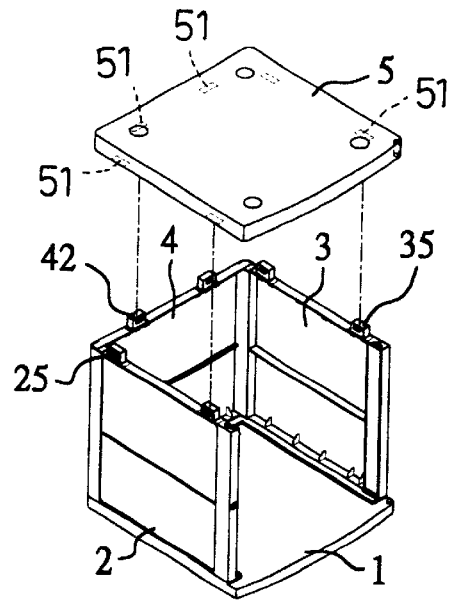
FIG. 5 is another exploded perspective view of a partially assembled cabinet of FIG. 1.
Figure 6:
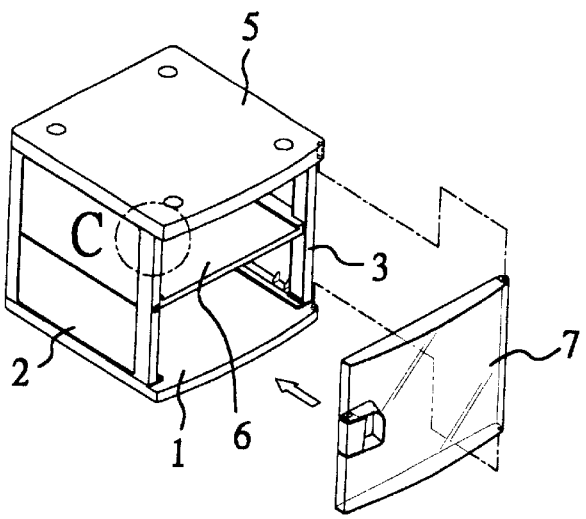
FIG. 6 is still another exploded perspective view of a partially assembled cabinet of FIG. 1.
Figure 7:
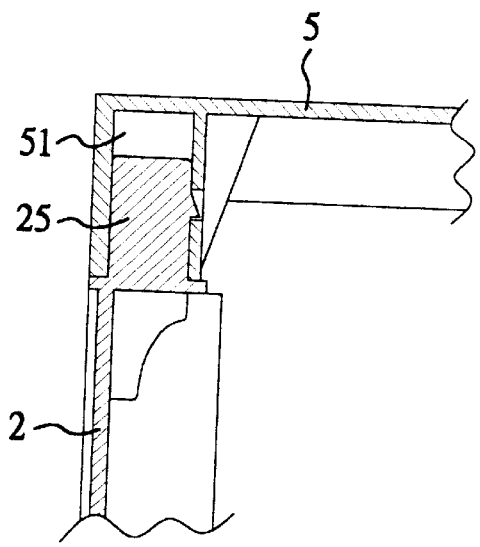
FIG. 7 is a greatly enlarged fragmentary sectional view of an area C circled in FIG. 6.
Figure 8:
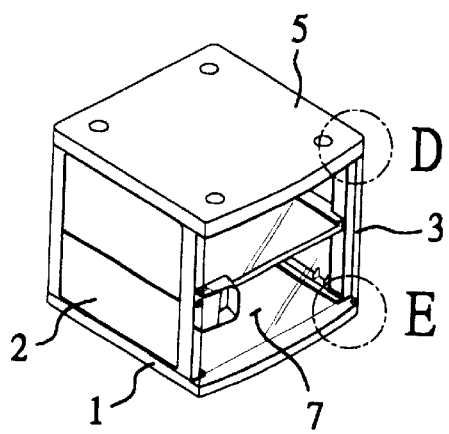
FIG. 8 is a perspective view of the assembled cabinet of FIG. 1.
Figure 9:
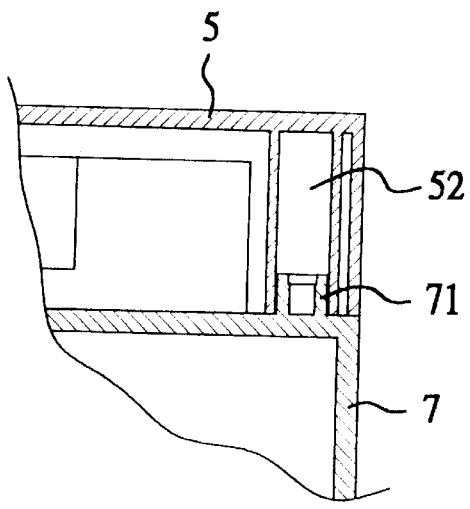
FIG. 9 is a greatly enlarged fragmentary sectional view of an area D circled in FIG. 8.
Figure 10:
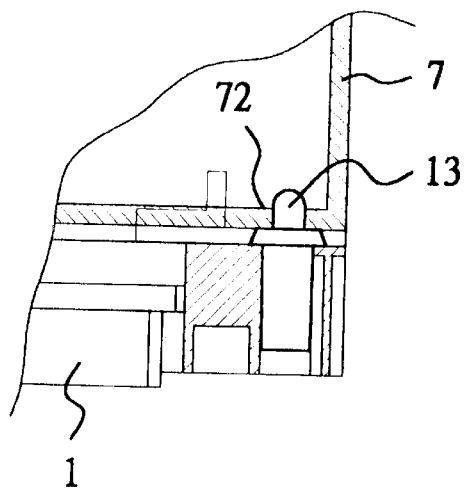
FIG. 10 is a greatly enlarged fragmentary sectional view of an area E circled in FIG. 8.

Referring to FIGS. 1 to 10, there is shown a first preferred embodiment of a cabinet constructed in accordance with the invention. The cabinet is substantially a parallelepiped and comprises a bottom plate 1, a left plate 2, a right plate 3, a rear plate 4, a top plate 5, a divider 6, and a door 7. Each of above components is detailed below. Bottom plate 1 comprises four slots 11, one on each corner, two spaced wells 12 on the rear side adjacent slots 11, and a projection 13 on a corner at the front side. Right plate 3 is a mirror image of left plate 2. Thus, a description of the left plate 2 is sufficient. Left plate 2 comprises two pegs 21, with one projected downwardly from the front and the other from the rear side, a front longitudinal groove 22, an abutment member 23 having a U-shaped cross-section clung onto the front longitudinal groove 22, a rear longitudinal groove 24, and two spaced studs 25 on the top side with one adjacent the front longitudinal groove 22 and the other adjacent the rear longitudinal groove 24. Right plate 3 comprises longitudinal groove 32 and an abutment member 33 having a U-shaped cross-section clung onto the front longitudinal groove 32. Rear plate 4 comprises two spaced studs 41 on the bottom side and two spaced studs 42 on the top side. Top plate 5 comprises six apertures 51 on the bottom side corresponding to studs 25, 35 and 42 and a slot 52 on a front corner at the bottom side. Preferably, door 7 has a fitted front transparent glass for visualization of articles stored in the cabinet. Door 7 comprises a projection 71 on the top at the side opposite to a handle which is magnetically connectable to the front side of the left plate 2 and a slot 72 on the bottom on the same side of the door 7 as the projection 71.

In assembly, first cling left plate 2 and right plate 3 onto the sides of bottom plate 1 wherein the pegs 21 and 31 are received in slots 11. Then, downwardly cling rear plate 4 onto bottom plate 1 and between left plate 2 and right plate 3 along the longitudinal grooves 24 and 34 wherein the studs 41 are received in wells 12. Next, cling three elongated side protrusions of divider 6 into the corresponding transverse central grooves of left plate 2, right plate 3, and rear plate 4. Then, cling door 7 onto bottom plate 1 by inserting projection 13 into slot 72. Finally, cling top plate 5 onto left plate 2, right plate 3, rear plate 4, and door 7 wherein studs 25, 35 and 42 are inserted into apertures 51 and projection 71 is inserted into slot 52, respectively.

Figure 11:
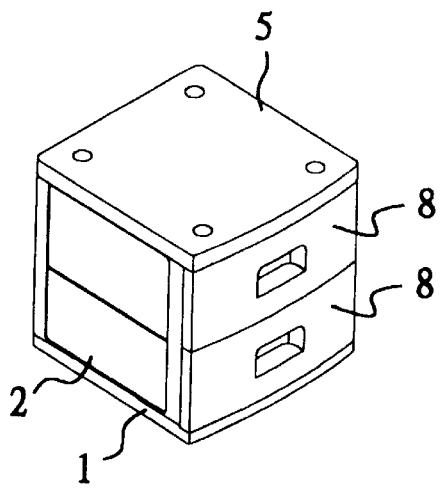
FIG. 11 is a perspective view of a second preferred embodiment of a cabinet according to the invention.

Referring to FIG. 11, there is shown a second preferred embodiment of a cabinet wherein two drawers 8 are mounted in the cabinet with divider 6 sandwiched therebetween before the door 7 is installed.

Figure 12:
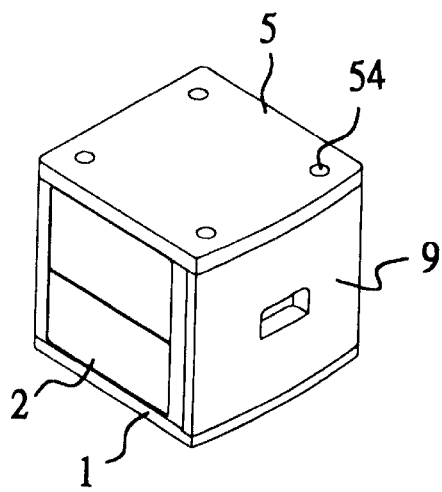
FIG. 12 is a perspective view of a third preferred embodiment of a cabinet according to the invention.

Referring to FIG. 12, there is shown a third preferred embodiment of a cabinet wherein divider 6 is eliminated by mounting a single large drawer 9 in the cabinet before door 7 is installed.

Figure 13:
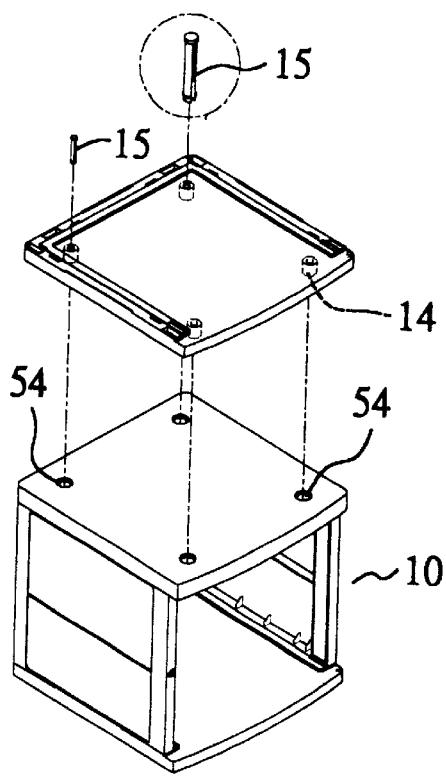
FIG. 13 is an exploded perspective view of a fourth preferred embodiment of a partially assembled cabinet according to the invention.
Figure 15:
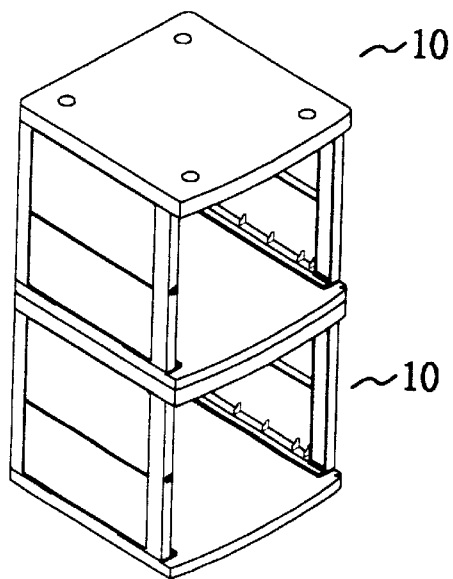
FIG. 15 is a perspective view of the assembled cabinet of FIG. 13.
Figure 14:
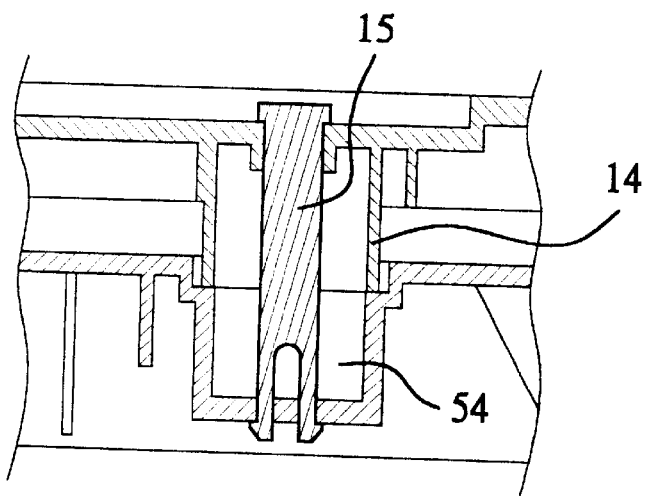
FIG. 14 is a greatly enlarged fragmentary sectional view of the fastener of a circled area in FIG. 13 in assembled cabinet of FIG. 13.

Referring to FIGS. 13 to 15, there is shown a fourth preferred embodiment of a cabinet. In this embodiment, four holes 54 are formed on the top plate 5 adjacent each corner of a first cabinet 10, and four hollow legs 14 are formed on the bottom of bottom plate 1 adjacent each corner of a second cabinet 10. Hence, the second cabinet 10 may be secured onto the first cabinet 10 by inserting four flexible plastic fasteners 15 through legs 14 and holes 54. This forms a two-deck cabinet 10 (FIG. 15).

While the invention has been described by means of specific embodiments, numerous modifications and variations could be made thereto by those skilled in the art without departing from the scope and spirit of the invention set forth in the claims.

What is claimed is:

1. A detachable cabinet comprising:
   a bottom plate including a front side and a rear side, with the front side having a first corner and a second corner, with the rear side having a third corner and a fourth corner, with the bottom plate further including a slot at each of the first, second, third, and fourth corners, with the bottom plate further including first and second spaced wells on said rear side adjacent said slots of the third and fourth corners, with the bottom plate further including a projection on one of the first corner and the second corner at said front side;
   a pair of side plates each including a bottom side, a front side, a top side and a rear side, with the side plates each including first and second pegs each projected downwardly from the bottom side, with the first peg being adjacent said front side and the second peg being adjacent said rear side, with the front sides of said side plates each including a front longitudinal groove and an abutment member having a U-shaped cross-section clung onto said front longitudinal groove, with the rear sides of said side plates each including a rear longitudinal groove, and with the side plates each including first and second spaced studs on said top side with the first stud being adjacent said front longitudinal groove and with the second stud being adjacent said rear longitudinal groove;
   a rear plate including a bottom side, a top side, first and second vertical sides, two spaced studs on said bottom side and two spaced studs on said top side;
   a top plate including a bottom side, six apertures on said bottom side and a slot on said bottom side at a front corner of the top plate; and
   a front door including a top side, a bottom side, a first side and a second side, with the front door including a handle on the first side and being magnetically connectable to said front side of one of said pair of side plates, with the front door including a projection on said top side at said second side opposite to said handle, and with the front door including a slot on said bottom side at said second side;
   wherein said pegs of said side plates are received in said slots of said bottom plate, said vertical sides of said rear plate are received in said rear longitudinal grooves of the pair of side plates, said bottom studs of said rear plate are received in said wells of said bottom plate, said projection of said bottom plate is inserted into said slot of said door, said studs of said side plates and said studs of said top side of said rear plate are inserted into said apertures of said top plate, and said projection of said front door is inserted into said slot of said top plate.

2. The cabinet of claim 1, further comprising a first drawer in said cabinet.

3. The cabinet of claim 1, wherein said front door further comprises a fitted transparent glass.

4. The cabinet of claim 1, wherein each of said side plates and said rear plate further comprises a transverse groove, with the cabinet further comprising a divider having three elongated side protrusions inserted into said transverse grooves.

5. The cabinet of claim 4, further comprising two drawers in said cabinet with said divider sandwiched therebetween.

6. The cabinet of claim 1, wherein said top plate further comprises a top and four holes on said top, and said bottom plate further comprises a bottom and four hollow legs on said bottom so that a first cabinet is capable of being secured onto a second cabinet by inserting four flexible plastic fasteners through said legs of the bottom plate and said holes of said top plate.

7. A detachable cabinet comprising:
   a bottom plate including a front side, a rear side, and first and second horizontal sides;
   a pair of side plates each including a bottom side, a front side, a top side and a rear side, with the front sides of said side plates each including a front longitudinal groove and an abutment member having a U-shaped cross-section clung onto said front longitudinal groove;
   a rear plate including a bottom side, a top side, and first and second vertical sides;
   a top plate including a bottom side; and
   a front door including a first side and a second side, with the front door including a handle on the first side and being connectable to said front side of one of said pair of side plates, with the front door being pivotally mounted by the second side to the front side of the other of said pair of side plates, with the bottom sides of the pair of side plates and the rear plate being detachably connected to the bottom plate, with the top sides of the pair of side plates and the rear plate being detachably connected to the top plate with the bottom plate further including a slot at each of the first, second, third and fourth corners, with the side plates each including first and second pegs projected downwardly from the bottom side, with the first peg being adjacent said front side and the second peg being adjacent said rear side, with the side plates each including first and second spaced studs on said top side, with the top plate including third, fourth, fifth and sixth apertures on the bottom side, with said pegs of said pair of side plates being received in said slots of said bottom plate, and with the studs of the pair of side plates being inserted into the third, fourth, fifth and sixth apertures on the top plate.

8. The detachable cabinet of claim 7 with the rear plate further including two spaced studs on said bottom side and two spaced studs on said top side, with the front side of the bottom plate having a first corner and a second corner, with the rear side of the bottom plate having a third corner, a fourth corner and first and second spaced wells on said rear side adjacent the third and fourth corners, with the bottom studs of said rear plate being received in said wells of said bottom plate, with the top plate including first and second apertures on the bottom side, with the studs of said top side of said rear plate being inserted into said apertures of said top plate.

9. The detachable cabinet of claim 8 with the rear sides of said side plates each including a rear longitudinal groove, with said vertical sides of said rear plate being received in said rear longitudinal grooves of the pair of side plates.

10. The detachable cabinet of claim 9 with the bottom plate further including a projection on one of the first corner and the second corner at said front side, with the top plate including a slot on said bottom side at a front corner of the top plate, with the front door including a projection on said top side at said second side opposite to said handle, and with the front door including a slot on said bottom side at said second side, with said projection of said bottom plate being inserted into said slot of said door, and with said projection of said front door being inserted into said slot of said top plate.

11. The detachable cabinet of claim 10, wherein said top plate further comprises a top and four holes on said top, and said bottom plate further comprises a bottom and four hollow legs on said bottom so that a first cabinet is capable of being secured onto a second cabinet by inserting four flexible plastic fasteners through said legs of the bottom plate and said holes of said top plate.

12. The detachable cabinet of claim 7, wherein said top plate further comprises a top and four holes on said top, and said bottom plate further comprises a bottom and four hollow legs on said bottom so that a first cabinet is capable of being secured onto a second cabinet by inserting four flexible plastic fasteners through said legs of the bottom plate and said holes of said top plate.

13. The detachable cabinet of claim 7 with the rear sides of said side plates each including a rear longitudinal groove, with said vertical sides of said rear plate being received in said rear longitudinal grooves of the pair of side plates.

14. A detachable cabinet comprising:

a bottom plate including a front side, a rear side, and first and second horizontal sides;

a pair of side plates each including a bottom side, a front side, a top side and a rear side, with the front sides of said side plates each including a front longitudinal groove and an abutment member having a U-shaped cross-section clung onto said front longitudinal groove;

a rear plate including a bottom side, a top side, and first and second vertical sides;

a top plate including a bottom side; and a front door including a first side and a second side, with the front door including a handle on the first side and being connectable to said front side of one of said pair of side plates, with the front door being pivotally mounted by the second side to the front side of the other of said pair of side plates, with the bottom sides of the pair of side plates and the rear plate being detachably connected to the bottom plate, with the top sides of the pair of side plates and the rear plate being detachably connected to the top plate, with the bottom plate further including a projection on one of the first corner and the second corner at said front side, with the top plate including a slot on said bottom side at a front corner of the top plate, with the front door including a projection on said top side at said second side opposite to said handle, and with the front door including a slot on said bottom side at said second side, with said projection of said bottom plate being inserted into said slot of said door, and with said projection of said front door being inserted into said slot of said top plate.

15. The detachable cabinet of claim 14, wherein said top plate further comprises a top and four holes on said top, and said bottom plate further comprises a bottom and four hollow legs on said bottom so that a first cabinet is capable of being secured onto a second cabinet by inserting four flexible plastic fasteners through said legs of the bottom plate and said holes of said top plate.

\* \* \* \* \*